May 10, 1960
S. T. CARTER
2,936,060
ARTICLE COMBINER
Filed July 9, 1958
5 Sheets-Sheet 1
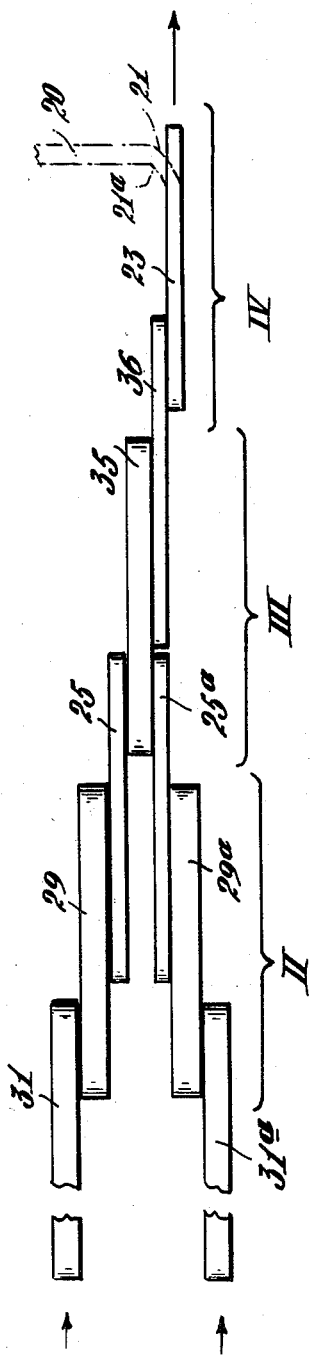
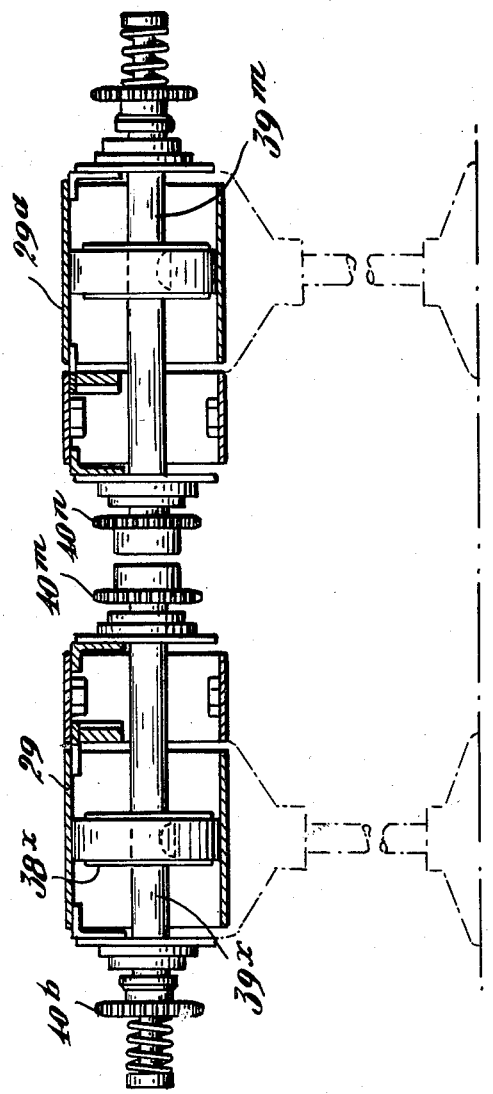
Inventor
Sidney T. Carter

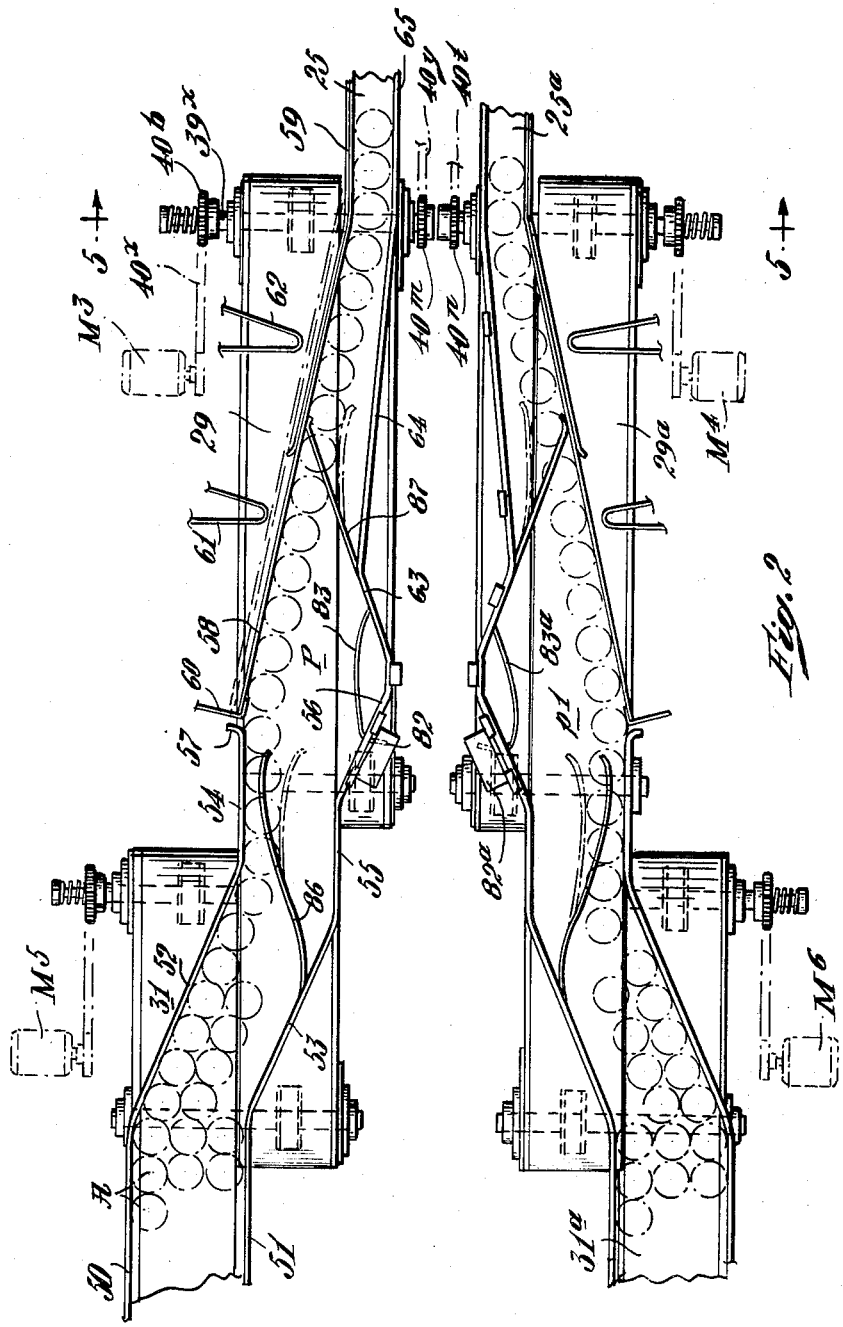

May 10, 1960
S. T. CARTER
2,936,060
ARTICLE COMBINER
Filed July 9, 1958
5 Sheets-Sheet 3
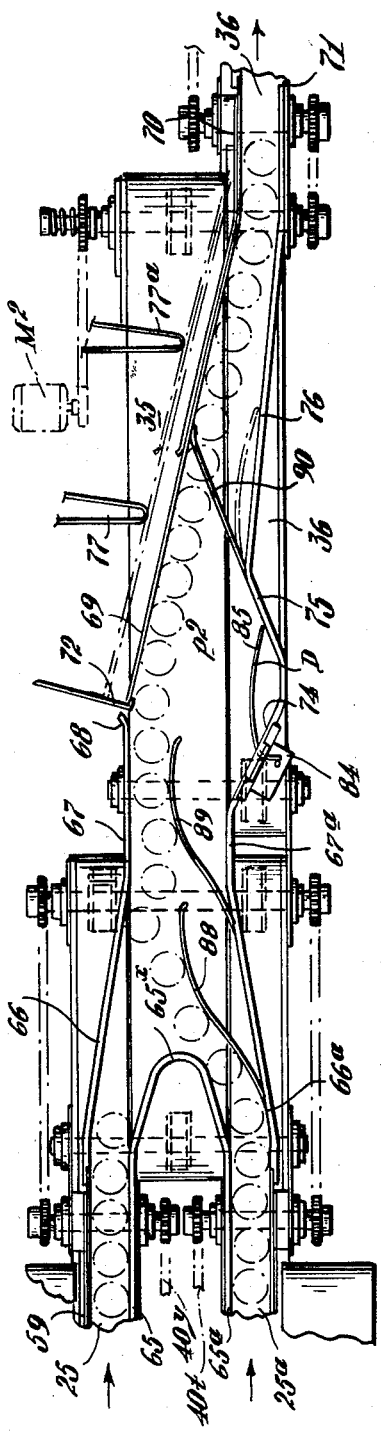
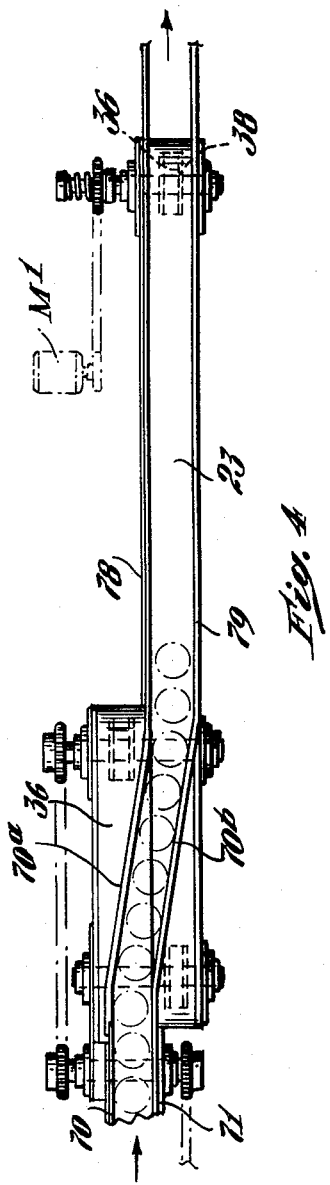
Inventor
Sidney T. Carter
by Roberts Cushman & Grant
Attys May 10, 1960
S. T. CARTER
2,936,060
ARTICLE COMBINER
Filed July 9, 1958
5 Sheets-Sheet 4
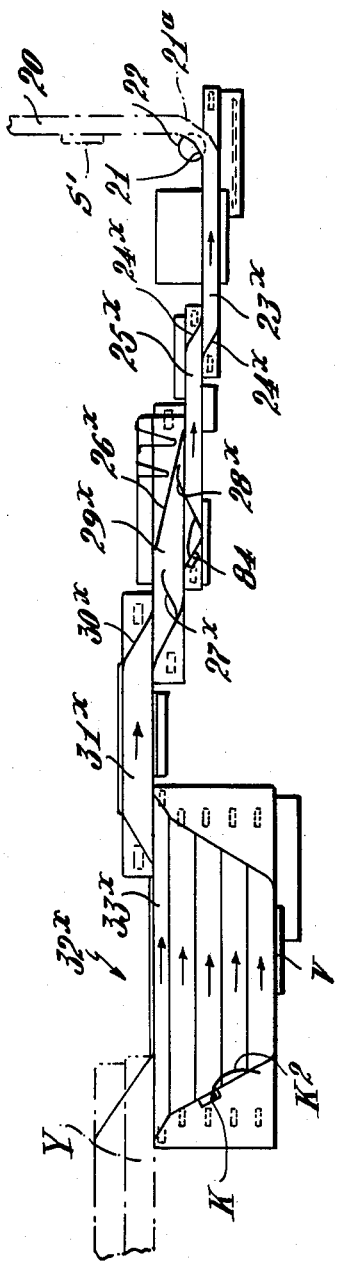
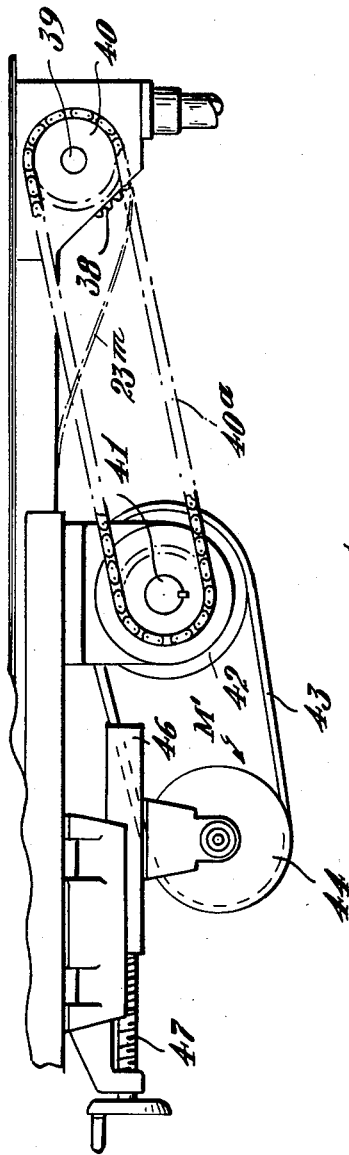
Inventor
Sidney T. Carter
by Roberts Cushman & Grover
Attys

United States Patent Office

2,936,060
Patented May 10, 1960

2,936,060

ARTICLE COMBINER

Sidney T. Carter, Shrewsbury, Mass., assignor to Geo. J. Meyer Manufacturing Co., Cudahy, Wis., a corporation of Wisconsin Application July 9, 1958, Serial No. 747,444

12 Claims. (Cl. 198—30)

This invention pertains to article combining apparatus, that is to say, to means operative automatically to arrange discrete articles, for instance containers such as cans or bottles, in tandem relation to form a single row (usually rectilinear) and relates more especially to apparatus comprising one or more combining units, each including a receiving conveyor (desirably of the kind which normally advances the articles uninterruptedly) which takes the articles from a supply, either in a disorderly mass or in two or more definite rows; a delivery conveyor parallel to the receiving conveyor and which is of a width such as to accommodate but a single row of articles disposed in tandem relation, and means operative to form the articles, advanced by the receiving conveyor, into a single row while transferring them to the delivery conveyor, and, when a plurality of such combining units are employed in association, also comprising means operative to merge the rows of articles, which are carried by the single-row delivery conveyors of the several combiner units, respectively, so as to form a single row for delivery to a processing apparatus or the like.

Basically, the invention employs the principle of feeding the articles from one conveyor to another over a crossover and as the articles pass from one conveyor to the next, the speed of the latter conveyor is proportionately greater so that at each step or change of speed, the articles are drawn forward to facilitate their intercalation to form a single line.

In accordance with the invention, the receiving conveyor of each combiner unit is designed to constitute metering means such that the apparatus will not receive articles in excess of a predetermined maximum rate.

Desirably, the apparatus comprises at least three parallel conveyors with means for diverting articles from each conveyor to the next in succession and with means operative, as the articles are being diverted from the first to the second conveyor, gently and resiliently to urge them transversely of their normal path of movement, thereby to intercalate them to form a single row, the third, at least, of said conveyors being a single-row conveyor.

Briefly stated, a simple combiner unit, according to this invention, comprises a receiving conveyor of a capacity to handle the maximum number of articles to be processed, and which is of a width to accommodate a plurality of articles advancing abreast; a secondary or intermediate conveyor parallel to the receiving conveyor, and which is driven at a linear velocity exceeding that of the receiving conveyor such that articles delivered to it by the receiving conveyor tend to form a single row, the velocity of the secondary conveyor being slightly more than that theoretically necessary to accommodate the articles delivered to it by the receiving conveyor, thereby to assist the articles in arranging themselves in a single row; and a single-row delivery conveyor, parallel to and adjacent to the intermediate conveyor, which is driven at a velocity slightly exceeding that of the secondary or intermediate conveyor. The intermediate conveyor is desirably of a width approximating that of the receiving conveyor, that is, of a width exceeding that of a single row of articles. Such an arrangement makes the shift from multiple to single row less abrupt and facilitates the provision of a pocket or article-accumulating chamber in which articles may hesitate momentarily while finding their way into the single row.

If more than one such simple combiner be required to handle the number of articles demanded by the processing unit, than the delivery conveyors of the several simple combiners will be arranged to deliver to a common or combining conveyor, which again is desirably of a width to accommodate a plurality of rows, the velocity of the combining conveyor being slightly greater than that theoretically necessary to accommodate, in a single row, the total number of articles received from the several delivery conveyors, and with means defining a pocket or chamber wherein articles may hesitate momentarily so as to facilitate the intercalation of the articles in the formation of said single row. Articles so formed into a single row, in moving along said combining conveyor, are transferred from the latter to a single-row delivery conveyor, which is desirably driven at a linear velocity somewhat exceeding that of the combining conveyor, and from the latter the articles may be conveyed to the processing unit in any desired manner.

More specifically stated, the invention, in the embodiment herein chosen for illustration, comprises apparatus for delivering articles, arranged in a single row and in tandem relation, to a processing unit, and to which, at times, articles may be presented at a rate exceeding the maximum capacity of said processing unit, and to which the articles may be delivered as a disorderly mass or in a plurality of distinct rows, said apparatus comprising, in combination, receiving conveyor means and a second conveyor means to which articles are diverted from said receiving conveyor means, means for so diverting the articles from the receiving to the second conveyor means and means for driving said two conveyor means, respectively, at predetermined different velocities, the linear velocity of the receiving conveyor means being according to the formula $$V = \frac{K^p \times D^m}{12 R^w}$$

where V is the velocity in feet of the receiving conveyor; $K^p$ is the maximum capacity of the processing unit in articles per minute; $D^m$ is the diameter in inches of an individual article; and $R^w$ is the number of rows of articles which the receiving conveyor can accommodate, and the linear velocity of the second conveyor, to which the articles are diverted from the receiving conveyor, is according to the expression $V^1 = VE$ where $V^1$ is the linear velocity in feet of said conveyor means and E is a value which may lie between 1.3 and 1.5, the value E being such as has been found by experiment to insure the orderly intercalation of the articles to form a single row in passing from the receiving conveyor to the second conveyor.

Objects of the invention are to provide automatic means, of simple type, operative to arrange discrete articles (whether supplied as a disorderly mass or in two or more distinct rows) to form them into a single row or line; to provide article-arranging apparatus, including a receiving conveyor, so constructed and arranged as to constitute metering means such as definitely to limit the number of articles which the apparatus will receive and deliver in a unit of time; to provide for arranging articles in a single row or line by the use of a succession of conveyors, which run at such relative linear velocities that, in passing from one conveyor to the next, the articles are so spaced that they may dispose themselves in a single row; to provide means which, as articles pass from one conveyor to the next, gently urges the articles to align themselves in a single row; to provide variable speed drive means for the several constituent conveyors whereby it is made possible to adjust the speed ratios of successive conveyors to insure optimum operating conditions; to provide means for stopping the receiving and other conveyors automatically in the event of a jam or the failure of the processing apparatus, to which the combiner delivers the articles, to take the articles at the intended rate; and to provide means for lubricating the apparatus without damage to, or disfiguring, the articles being conveyed.

For the attainment of the above objects, and in particular the arranging of discrete articles in a single row for delivery one-by-one in succession to a processing unit, the invention provides apparatus comprising a plurality of conveyors and means for diverting articles from one conveyor to the next, drive means for the several conveyors so designed that each conveyor, in succession, has a linear velocity exceeding that of the conveyor next preceding it, the linear velocity of the first of said conveyors being such that it constitutes metering means operative to limit the number of articles, which the apparatus will receive per unit of time, to the maximum number which the processing unit can handle per unit of time.

Other and further objects and advantages of the invention will be pointed out in the following more detailed description and by reference to the accompanying drawings wherein, Fig. 1 is a diagrammatic plan view, showing an arrangement in which two simple combiner units, each embodying the principle of the present invention, are so assembled that their delivery conveyors, each carrying a single row of articles, discharge said articles to conveyor means arranged to dispose all of said articles to form a single row, which is advanced by a suitable conveyor device to a processing unit (not shown), for example, a packer;

Fig. 2 is a diagrammatic plan view, to larger scale and in more detail, illustrating that portion of the apparatus of Fig. 1 which is embraced by the bracket II;

Fig. 3 is a plan view, similar to Fig. 2, of that portion of the apparatus of Fig. 1 which is embraced by the bracket III;

Fig. 4 is a plan view, similar to Fig. 2, of that portion of the apparatus of Fig. 1 which is embraced by the bracket IV;

Fig. 5 is a fragmentary transverse section, to larger scale, substantially on the line 5—5 of Fig. 2;

Fig. 6 is a diagrammatic plan view showing a simple combiner unit, according to the present invention, associated with an accumulator operative to receive articles from a supply and temporarily to store them during extended periods in which the combiner is unable to take articles as fast as they are delivered by the supply;

Fig. 8 is a fragmentary elevation, illustrative of a generally conventional type of variable speed drive useful in the apparatus of the present invention.

Figure 7:
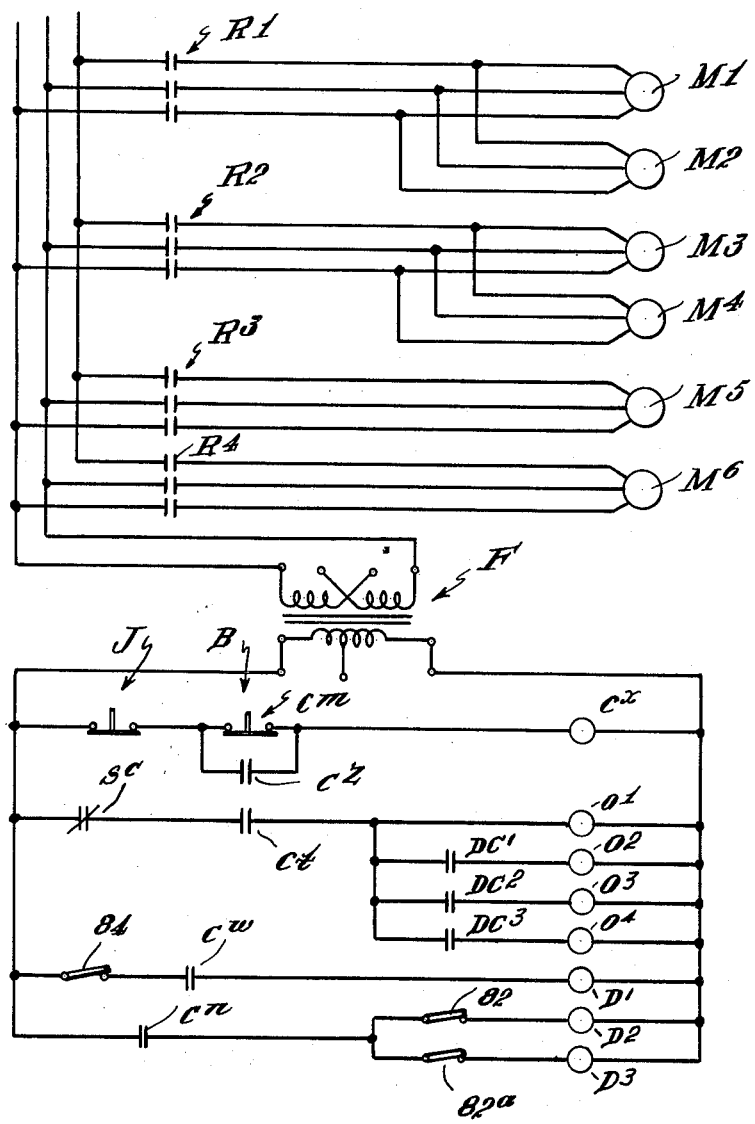
Fig. 7 is a wiring diagram, illustrating a preferred arrangement for controlling the motors which drive the conveyors of the combiner units of Figs. 1 to 5.

The combiner of the present invention is designed to combine two or more rows of cans or bottles to form a single line, this being attained by delivering the articles from one conveyor to another by the action of appropriate switch or diverting means, and by driving the conveyor, onto which the articles are switched, at a linear velocity somewhat greater than that of the first conveyor. As above noted, the first of these conveyors acts as a metering conveyor, its widthwise capacity and its linear velocity being such that the total number of articles which it can deliver per unit of time does not exceed the capacity of the processing apparatus to which the articles are to be delivered, and thus the combiner serves to prevent the processing apparatus from being choked by an oversupply of articles.

Referring first to Fig. 6, the numeral 20 designates a conveyor by means of which articles, moving along in succession in a single row, are delivered to a processing unit (not shown), for example, a packer. The articles are delivered to the conveyor 20 by the action of suitably shaped guide rails 21 and 21a, assisted by a rotary horizontal table 22, from a conveyor 23x (here shown as at right angles to the conveyor 20). The articles form a single row on the conveyor 23x and are delivered to the conveyor 23x, by suitable guide rails 24x, from a conveyor 25x on which the articles are also arranged in a single row. The articles are diverted from a conveyor 29x to form a single row on the conveyor 25x by means of a resilient guide rail 26x, assisted by the leaf-springs 27x and 28x. The articles may be delivered onto the conveyor 29x, in a more or less disorderly mass (by the action of a diagonal guide rail 30x) from a conveyor 31x (here referred to as the receiving conveyor) and which is of such width as to accommodate articles disposed to form two or more rows, or articles which are in a disorderly mass of a width exceeding the width of a single article. As illustrated in Fig. 6, the articles are received by the conveyor 31x from an accumulator device 32x, comprising a plurality of parallel conveyors, with appropriate means for driving them, and which is designed to store a large number of articles in readiness for delivery to the conveyor 31x. As illustrated in Fig. 6, the articles are delivered to the accumulator 32x by a supply conveyor Y which may, for example, receive the articles, if bottles or cans, from a labelling machine, the conveyor Y being driven at constant or variable speed according to the mode of operation of the machine which supplies the articles to the conveyor Y.

In the arrangement of Fig. 6, a single accumulator 32x is illustrated, but it is manifest that, if desired, several such accumulators may be arranged in succession for the storage of a larger number of articles, it being noted at this point that the capacity of a single accumulator is limited, since if the accumulator be too long the column of bottles in each row will be so great that the pressure on the endmost bottles may cause breakage.

Before describing in detail the improved combiner of the present invention, the general operation of the apparatus of Fig. 6 may be stated as follows:

It may be assumed that the conveyor 20 delivers the articles one-by-one in succession to a processing unit, for example, a packer, of limited capacity. Accordingly, it is necessary to equip the conveyor 20 with means, for example, a pressure actuated switch S', which responds to the pressure of articles backing up on conveyor 20 if the normal discharge of articles by the conveyor 20 is slowed down or stopped. Thus, if the conveyor 20 becomes filled with articles, the operation of the switch S' results in stopping the conveyors 23x, 25x, 29x and 31x. The accumulator 32x then continues to run until it is filled to capacity, whereupon the pressure of containers against a detector K2 actuates the switch K, thereby stopping the drive V for the accumulator 32x. Thus the switch S' acts to control the entire apparatus preceding it. As soon as the pressure of containers on the switch S' ceases, the conveyor 23x is automatically started, but this starting of the conveyor 23x is desirably delayed for two or three seconds by the use of a time-delay relay in the circuit of the motor which drives the conveyor 23x. However, it is not necessary to delay the starting of conveyor 23x, providing the switch S' be located a distance of fifteen feet or more beyond the end of the conveyor 23x. After the starting of the conveyor 23x, and with a further delay of from two to three seconds, the drive for conveyors 25x and 29x will be started. Conveyor 31x, which is driven by a variable speed drive, will then start after a further interval of two to three seconds by reason of a time-delay relay in the circuit of the motor. When conveyor 31x starts, drive V for the accumulator 32x automatically starts at the same time and continues to run so long as conveyor 31x is running. In the event that articles fill the accumulator 32x to capacity, they will act upon the detector K2 and thus actuate switch K to stop the drive V for the accumulator, and also, if desired, to stop any preceding accumulators and the drive for the supply conveyor Y. However, if desired, this automatic control for the drive of conveyor Y may be omitted.

During normal operation, articles are fed through the accumulator 32x in a single row on the single-row conveyor 33x and, thence onto the conveyor 31x, where they accumulate to form a predetermined number of rows, for example three, although not necessarily forming any specific pattern. Containers leaving the conveyor 31x move successively onto the conveyors 29x, 25x and 23x, being funneled from conveyor 29x into a single line by deflector springs 27x and 28x and the combiner guide rail 26x. The speeds of conveyors 23x, 25x, 29x and 31x are important and control the efficiency of the combiner. Conveyor 31x constitutes a metering conveyor and its speed has a direct effect on the efficient operation of the combiner. The speed of conveyor 31x must be adjusted so that it cannot feed more than the maximum number of containers which the processing unit (fed by conveyor 20) is capable of handling. The guide rails for conveyor 31x are adjustable to accommodate two or more lines of containers.

If, while the combiner apparatus is running in normal production, the articles back up on conveyor 20, the combiner is automatically stopped, as above described, by the action of pressure switch S', allowing the articles to maintain their relative position without crowding or accumulating in any area of the combiner proper. The accumulator continues to run until it fills to maximum capacity and then is stopped by the switch K.

When the switch S' on the conveyor 20 is released after such a stoppage, the delayed starting of the drives for the several conveyors automatically prevents the crowding of articles and allows the system to go back into normal production in a matter of from six to nine seconds. At the same time, the accumulator 32x empties itself of containers and is ready for the next stop which may occur. If, during a normal flow of containers, a jam occur on conveyors 25x or 29x, the containers will back up and actuate a switch 84 (hereafter described), thereby stopping the conveyor 31x. Conveyor 31x will automatically start again when such a jam has been cleared up. While hereinabove, general reference has been made to the accumulator 32x and its function, the accumulator per se is not herein described in detail nor claimed as a part of the present invention.

Fig. 6 illustrates but a single combiner unit comprising the conveyors 31x, 29x and 25x, but in Fig. 1, two such simple combiner units are shown as so arranged that their single-row delivery conveyors 25 and 25a deliver the containers to a common conveyor 35 of a width exceeding that of a single row of containers (herein referred to as a "combining" conveyor), and which, in turn, delivers the containers to form a single row upon a single-row conveyor 36 which delivers them to the conveyor 23, being the last conveyor of the assembly (which corresponds in this respect to the conveyor 23x of Fig. 6), from which they are diverted onto the conveyor 20 leading to the processing apparatus.

In Fig. 1, the receiving conveyor 31 and the secondary or intermediate conveyor 29 correspond to those numbered 29x and 31x in Fig. 6, while the conveyors 29a and 31a are the receiving and intermediate conveyors of the second combiner. It will be understood that the receiving conveyors 31 and 31a will be supplied with articles, either directly from suitable sources of supply such, for example, as labeling machines, or through intervening accumulators (not shown) such as the accumulator 32x of Fig. 6.

Since the combiners, whose receiving conveyors are designated by the numerals 31 and 31a in Fig. 1, are substantially identical (except that one is arranged to the right and the other to the left of the combining conveyor 35), only the combiner unit, whose receiving conveyor is numbered 31, need be described here in detail. While the conveyors employed may be of any desired type, it will be assumed that they are all of the endless chain constantly moving type customary, for example, in the bottling art, and which are so devised as to provide substantially horizontal surfaces upon which the articles may rest, but on which the articles may slide freely in a transverse direction when they contact deflector means designed for this purpose.

As diagrammatically illustrated in Figs. 2, 3 and 4, the conveyor 23 is driven by a motor $M^1$, the conveyors 35 and 36 are driven by the motor $M^2$; conveyors 25 and 29 are driven by the motor $M^3$; the conveyors 25a and 29a by the motor $M^4$; the conveyor 31 by the motor $M^5$, and the conveyor 31a by the motor $M^6$. Between each motor and the conveyor which it drives, there is interposed a variable speed transmission.

While any desirable type of variable speed drive may be employed, one such as illustrated in Fig. 8 has been found useful for the purpose. Assuming that the drive illustrated is that used for driving the chain 23m of conveyor 23 (Fig. 1), the chain of this conveyor passes around the sprocket wheel 38 on a shaft 39 mounted in suitable bearings and to which is fixed a sprocket 40 (Fig. 8) which is driven by a chain 40a which engages a sprocket on a shaft 41 to which is fixed one of the pulleys 42 of a Reeves-type drive, this pulley 42 being embraced by a belt 43 of the V-type, which also embraces a pulley 44 on the shaft of the motor $M^1$. This motor is mounted on a slidable base 46, whose position may be varied by turning the screw threaded shaft 47. By moving the motor, which may be of the constant speed type, the shaft 41 may be driven at different speeds, and thus the conveyor 23 may be driven at the desired linear velocity. The variable speed drives for the other conveyors may be of the same type as that just above described.

Referring to Fig. 2, the receiving conveyor 31 is shown as of a width, for example, of the order of seven and one-half inches, such as to accommodate three rows of the articles A (for instance bottles or cans) each of a diameter of two and three-quarters inches.

The conveyors 25 and 29 are here shown (Fig. 2) as (driven by the same motor $M^3$. Thus, the motor $M^3$ (Figs. 2 and 5), by means of a sprocket chain 40x, drives the sprocket 40b (Fig. 5) connected by a slip clutch to the shaft 39x, which carries the sprocket 38x, driving the conveyor 29. The shaft 39x also has a sprocket 40m on its opposite end which drives a sprocket chain 40y (Fig. 2), by means of which the conveyor 25 is driven. In the same way, the shaft 39m (Fig. 5) (driven by motor $M^4$) drives the conveyor 29a and has a sprocket 40n (Fig. 2) which, by means of a chain 40t (Fig. 2), drives the conveyor 25a.

Referring again to Fig. 2, the conveyor 31 is provided with rigid guide rails 50 and 51, spaced apart as above suggested to accommodate between them three parallel rows of articles A. Desirably, the guide rails are adjustable toward or from each other, in customary manner, and are normally parallel. Near the delivery end of the conveyor 31, these guide rails 50 and 51 merge with diagonal guide rails 52 and 53, respectively, which, in turn, merge with parallel guide rails 54 and 55 at opposite sides of the receiving end portion of conveyor 29. At an intermediate point in the length of the conveyor 29, a guide rail 55 merges with a guide rail 56 which extends diagonally across the conveyor 25, while the guide rail 54 terminates at 57 and is replaced at that side of conveyor 29 by a flexible rail 58, which extends forwardly and diagonally across the conveyor 29 and whose forward end portion is secured to a rigid guide rail 59 at one side (the left side as here shown) of the conveyor 25. The flexible rail 58 normally occupies the full line position, shown in Fig. 2, where its free end engages a stop 60. This flexible portion 58 is so devised that it normally tends to engage the stop 60, but (in response to the pressure of articles which may accumulate in the space P (whose floor is defined partly by conveyor 29 and partly by conveyor 25), this flexible guide rail 58 may flex outwardly, as shown in broken lines in Fig. 2, so far as is permitted by the fixed stops 61 and 62.

The fixed guide rail, 56, after first extending diagonally across the conveyor 25, then continues forwardly (as shown in 63) in an opposite diagonal direction partway across the conveyor 25, and then again extends forwardly and diagonally outward toward the right-hand margin of the conveyor 25 (as shown in 64) so as, with the fixed end portion 65 of the flexible rail 58, to provide a funnel-like entrance to the space between the fixed side rails 59 and 65 of the conveyor 25.

Near the terminal end of the conveyor 25 (Fig. 3), the fixed guide rail 59 merges with a fixed rail 66 which extends diagonally across the width of the conveyor 25, while the fixed guide rail 65, at the right-hand side of the terminal portion of conveyor 25, merges with a U-shaped bend 65x with which the fixed left-hand guide rail 65a of the conveyor 25a also merges, this bend 65x being symmetrical with respect to the width of the conveyor 35. The right-hand guide rail of conveyor 25a merges with a rigid terminal portion 66a, which extends diagonally across the width of the terminal portion of the conveyor 25a, and merges with a terminal portion 67a which is parallel with the terminal portion 67 of the guide rail 66, the parts 67 and 67a being at opposite sides of the combining conveyor 35. This latter conveyor is a multi-row conveyor, here shown as of a width approximating that of the conveyor 31, that is to say, such as to accommodate three rows of articles disposed in parallel relation, although a lesser width, for example, to accommodate two rows, may be sufficient. The fixed guide rail 67 terminates at 68, Fig. 3 and is then replaced by a flexible guide rail 69 which extends diagonally across the entire width of combining conveyor 35 and whose forward end is fixed to a stationary rigid guide rail 70 (Figs. 3 and 4) near the terminal end of the conveyor 36, at the left side of the latter. A corresponding fixed guide rail 71 is arranged at the opposite side of the terminal portion of the conveyor 36. The flexible guide rail 69 is so devised that it tends to swing inwardly across the conveyor 35, but such motion is limited by a fixed stop 72. Outward flexing of guide rail 69 is limited by stops 77 and 77a.

The guide rail 66a, after extending diagonally across the conveyor 35, merges with a fixed rail 67a parallel to the edge of the conveyor 35, and then extends (as shown at 74) diagonally, forwardly and outwardly across the conveyor 36 to the right-hand edge of the latter, and then again extends inwardly and forwardly (as shown in 75) partway across the conveyor 36 and diagonally of the latter, and then extends outwardly again, as shown at 76, to merge with the fixed rail 71. The rails 69 and 75 define a funnel-like entrance tapering toward the space between the guide rails 70 and 71 at opposite sides of the conveyor 36. The flexible guide rail 69 normally occupies the full line position shown in Fig. 3, but in response to an abnormal accumulation of articles in the space P² (whose floor is defined, in part, by conveyor 35 and in part by conveyor 36), this guide rail 69 may move outwardly to the position shown in broken lines, such motion being limited by stops 77 and 77a.

Referring to Fig. 4, the fixed guide rails 70 and 71 merge with rails 70a and 70b (corresponding in function to the rails 24x of Fig. 6), near the terminal portion of the conveyor 36, which extend diagonally across the conveyor 23 and merge with the fixed parallel guide rails 78 and 79 disposed at opposite edges respectively of the conveyor 23.

The fixed guide rails 78 and 79 merge with diagonal parts 21 and 21a (Fig. 6), which extend diagonally across the conveyor 23 and which merge with parallel fixed guide rails (not shown) at opposite sides of the conveyor 20.

Referring again to Fig. 2, a switch 82 is mounted on the fixed rail 56, and in the space P there is arranged a detector 83 which, in response to the pressure of articles massed within the space P, actuates the switch 82, thereby stopping the motor M⁵ which drives the conveyor 31. A similar switch 82a actuated by a detector 83a in chamber P¹ (whose floor is, in part, defined by conveyor 29a and in part by conveyor 25a) controls the motor M⁶ which drives conveyor 31a.

A switch 84 (Fig. 3) is fixed to the guide rail 74, and a detector member 85 within the space P², in response to the massing of articles within the space P², actuates the switch 84, thereby stopping the several motors which drive the conveyors 31, 31a, 29, 29a, 25 and 25a. The electrical circuits involved will be described hereinafter by reference to Fig. 7.

Referring again to Fig. 2, a very flexible leaf spring 86 is attached at one end to the diagonally extending guard rail 53 and normally reaches across the conveyor 29 nearly to the fixed guide rail 54. A generally similar flexible leaf spring 87 is attached at one end to the diagonally extending guide rail 63 and normally reaches across the conveyor 29 so that its free end is near, or actually contacts, the inner surface of the flexible guide rail 58. These flexible leaf springs 86 and 87 have as their only function that of applying gentle pressure to the articles, as they move from the conveyor 31 onto the conveyor 29, to assist them in aligning themselves to form a single row. It is not intended that these springs exert substantial retarding pressure upon the articles, but that they merely exert a constant light pressure urging the articles gently toward the fixed rail 54 and the flexible rail 58, respectively. Similar leaf springs are associated with conveyor 29a.

Referring to Fig. 3, similar, very flexible leaf springs 88 and 89 are fixed, each at one end, to the guide rail 66a and extend in a generally diagonal direction partway across the conveyor 35. Another similar leaf spring 90 is secured to the fixed guide rail 75, extending forwardly and diagonally of the conveyor 36, and having its free end normally in contact with or adjacent to the flexible guide rail 69.

The several leaf springs above referred to may be approximately 0.020 inch thick and 2 inches wide, and they are so mounted on the respective diagonally extending fixed rails that they may be adjusted along said rails to space their free ends more or less from the rails at the opposite side of the corresponding conveyor.

If, for example, two articles, side-by-side, approach the spring deflector 86 (Fig. 2), the latter causes the article which first contacts it to be retarded slightly so that said article automatically works itself into the space behind the article which is nearer to the opposite guide rail. Usually, articles, in leaving the free end of deflector 86, will be accurately placed in a single row; but if they are not so placed, the action of the spring 87 tends to insure such alignment, while the yieldable guide rail 58 also assists in assuring the alignment of the articles. The spring deflectors 88, 89 and 90 and the resilient guide rail 69 function in the same way to insure the proper alignment of articles delivered by the conveyors 25 and 25a onto the conveyor 35.

As above suggested, the present invention is based upon the principle of transferring the articles from one conveyor to another and driving successive conveyors faster than those preceding, so that articles, which may be disposed in two or more rows on the first or receiving conveyor, automatically form themselves into a single row or line before reaching the terminal end of the delivery conveyor. While the exact ratio of speeds of conveyors may vary slightly, excellent results have been obtained by the use of a speed ratio between conveyors 31 and 29 of 1 to 1.3, with a ratio of speed between conveyor 29 and 25 of 1 to 1.27.

Merely by way of example, it will be assumed that articles are moving along the conveyor 31 at the rate of four hundred and twenty-five articles per minute, while the same number of articles are moving along the conveyor 31a, and that each article is 2¾ inches in diameter and that the conveyors 31 and 31a are each of a width to accommodate three rows of articles. Then if the conveyors 31 and 31a are to act as metering conveyors, that is to say, to limit the number of articles fed to the processing unit to 850 per minute, then the proper linear velocity of the conveyors 31 and 31a may be determined by multiplying 425 by 2.75 and dividing by 12 times 3, giving a velocity of approximately 32 feet per minute for conveyors 31 and 31a. Assuming that the conveyors 31 and 31a are of a length of four feet or more, then, even though articles be supplied to the receiving ends of the conveyors 31 and 31a at a greater rate than 425 per minute, the conveyors 31 and 31a will not receive any more than 425 articles per minute; and thus, the total number of articles which the conveyor 20, which feeds the processing unit, can ever receive will not exceed 850 per minute.

In order to insure the proper alignment of the articles into a single row, it has been found desirable, from experimental tests, to drive the conveyors 29 and 29a at a speed exceeding that of conveyors 31 and 31a. While, as above suggested, a speed ratio of 1:1.3 as between conveyors 31 and 29 has been found desirable, this ratio could be increased (for example, to 1:1.5), if desired. However, it has been found by experiment that a ratio as low as 1:1.2 is not satisfactory.

Thus, to determine the proper velocity for the conveyor 29, the velocity (thirty-two feet per minute) of conveyor 31 should be multiplied by 1.3 and then, because the conveyor 29 carries but one row of articles while the conveyor 31 carries three rows of articles, this result should again be multiplied by 3, thus obtaining a velocity for the conveyor 29 of approximately 125 feet per minute. This provides additional space of approximately 30% to assist the articles in working themselves into a single line in transferring from the conveyor 31 to the conveyor 29. If a ratio of less than 1:1.3 between conveyors 31 and 29 be used, it is found that difficulty is experienced in causing the articles to arrange themselves without tendency to double-up in passing through the chamber P.

Since the combining conveyor 35 receives a single row of articles from each of the conveyors 25 and 25a, respectively, the linear velocity of the conveyor 35 should exceed that of conveyors 25 and 25a (the latter traveling at the same speed as conveyors 29 and 29a). Thus, starting with the velocity of the conveyors 31 and 31a, which as above suggested in the example given is 32 feet per minute, this velocity should be multiplied by 6 to allow for the three rows of articles on each of the conveyors 31 and 31a to be resolved into a single row on the conveyor 35, and then multiplying by a factor which provides additional space on the conveyor 35 to allow the articles readily to form themselves into a single line in passing through chamber P². A factor of 1.25 has been found by experiment to be suitable, with the result that the linear velocity of the conveyor 35 should be approximately 240 feet per minute.

In going from conveyor 29 to conveyor 25, or from conveyor 35 to conveyor 36, where the velocity of the articles is high, a lesser velocity ratio may be employed in transferring the articles from one conveyor to the next than in transferring from conveyor 31 to 29, since, due to the momentum of the articles, they appear to form themselves into a single line much more readily than they do at slower speeds. Moreover, since it is not desirable to have the final conveyor 23 of the series running any faster than is necessary, it is preferred to employ ratios of less than 1:1.3 between conveyors following the conveyor 29.

Since the speed of the conveyor 35 is quite high, the conveyor 36 need be driven only at a slightly higher speed than the conveyor 35 in order to assure easy transfer of the articles from the conveyor 35 to the conveyor 36, and a ratio of 1:1.1 has been found useful for this purpose, so that assuming the speed of the receiving conveyor 31 to be thirty-five feet per minute, the conveyor 36 may be driven at a speed of approximately 264 feet per minute. Since, by the time the articles have neared the terminal end of the conveyor 36, they are safely arranged in a single row, it is possible to drive the conveyor 23 at the same speed as the conveyor 36 without jamming or displacing the articles from a single line.

Referring to Fig. 7, the six motors which are employed are indicated at the upper part of the sheet. Motors $M^1$ and $M^2$ are controlled by the starter $R^1$. Motors $M^3$ and $M^4$ are controlled by the starter $R^2$. Motor $M^5$ is controlled by the starter $R^3$, and motor $M^6$ is controlled by the starter $R^4$. The coils $O^1$, $O^2$, $O^3$ and $O^4$ of the four starters are indicated at the lower half of the sheet.

The transformer F reduces the voltage of the supply circuit to a suitable value for the operation of the control network. The contacts of the pressure-responsive switch $S^1$ are indicated at SC, Fig. 7. These contacts are normally closed, but if articles back up and jam on the conveyor 20, these contacts will open automatically and thereby stop all of the conveyors comprised in the apparatus herein described, as about to be explained.

Pressing the starter button B closes contacts $C^m$ energizing the coil $C^x$ of a holding relay whose contacts $C^z$ maintain the circuit closed after release of button B. If at this time the contacts $S^c$ of the pressure-actuated switch $S^1$ are closed, the closing of the second set of relay contacts $C^t$ completes the circuit through coil $O^1$, and motors $M^1$ and $M^2$ are started. The energizing of coil $O^1$ also closes contacts $C^w$ and energizes the coil $D^1$ of a time delay relay. After a predetermined time, the contacts $DC^1$ close, thus energizing coil $O^2$ which starts motors $M^3$ and $M^4$. At the same time contacts $C^n$ are closed, thus energizing coils $D^2$ and $D^3$ of two time delay relays (providing switches 84 and 84a are closed), the latter being set for a longer delay than the first. After a predetermined time, contacts $DC^2$ close, energizing coil $O^3$ and starting motor $M^5$, and after a further interval, contacts $DC^3$ close, energizing coil $O^4$ and starting motor $M^6$.

It may here be repeated that motors $M^1$ and $M^2$ drive the conveyors 23, and the conveyors 35 and 36, respectively; that motors $M^3$ and $M^4$ drive conveyors 25 and 29, and the conveyors 25a and 29a, respectively; and that motors $M^5$ and $M^6$ drive conveyors 31 and 31a, respectively.

It will now be assumed that the apparatus is in operation with all conveyors running. If for any reason a jam occurs so that articles accumulate in the pocket P, such accumulated articles will open the switch 82 so that the coil $D^2$ of the holding relay is de-energized, thus opening the circuit at the contacts $DC^2$ and so de-energizing the coil $O^3$ of motor starter $R^3$ and stopping the motor $M^5$ and the conveyor 31. As soon as the accumulation of articles in the pocket P has been cleared up, the switch 82 closes, and after a time delay, the motor $M^5$ will again be started. The accumulation of articles in the pocket $P^1$ will, in a similar way, actuate the switch 82a so as to stop the motor $M^6$ and conveyor 31a.

If a jam of articles occurs in the pocket $P^2$, the articles which accumulate will open the switch 84, thus de-energizing the coil $D^1$ of the time delay relay so that the contacts $DC^1$ will be separated to break the circuit through the coil $O^2$ of motor starter $R^2$, thus stopping the motors $M^3$ and $M^4$. De-energizing coil $O^2$ also breaks the circuit at contacts $C^n$, de-energizes the coils $D^2$ and $D^3$ and thus opens the circuits at the contacts $DC^2$ and $DC^3$, thus de-energizing the coils $O^3$ and $O^4$ and so stopping the motors $M^5$ and $M^6$. When this jam is cleared, the switch 84 again closes and the conveyor system starts up again as previously described.

If a jam occurs on the conveyor 20, the switch S′ opens breaking the circuit at $S^c$, and so stopping all of the motors. When such a jam is cleared, the switch S′ closes and the system will again start as previously described, the conveyor 23 starting first and then, after predetermined time intervals, the preceding conveyors start into action.

From the above, it may be observed that, in combining the articles into a single line, the speed of the receiving conveyor, for example the conveyor 31, is definitely predetermined with reference to the capacity of the processing unit to be supplied, and then successive conveyors are driven at slightly greater linear velocities thereby, through the help of the properly arranged guide rails and spring deflectors, the articles are automatically arranged in a single line for delivery to the conveyor 23, and thence to the conveyor 20.

It will be understood that a single combiner unit, comprising conveyors 31, 29 and 25, may be sufficient under certain circumstances, since, in transferring from the conveyor 31 to the conveyor 29 and then to the conveyor 25, the articles, which on the conveyor 31 form several rows or a disorderly mass, are reduced to a single row on the conveyor 25. However, for combining a larger number of articles, the arrangement shown in Fig. 1 (and hereinabove described in detail) may be employed, or an even greater number of the simple combiner units may be so assembled, in a manner generally similar to that above described, as to combine a much larger number of rows or a larger mass quantity of articles so as to form a single row.

When the combiner of the present invention is employed for arranging cans in a single row (the cans being received from a pasteurizer), it is not advisable to employ soap as a lubricant for insuring easy movement of the cans from one conveyor to another, since the use of soap for this purpose would require subsequent washing of the cans; and for this reason, it is proposed to spray the conveyor with water and to provide wear strips of hard maplewood impregnated with oil at the crossover portions of the apparatus, thereby automatically to lubricate the surface of the chain, whether it is wet or dry.

While one desirable embodiment of the invention has herein been described by way of example, it is to be understood that the invention is broadly inclusive of all equivalents falling within the scope of the appended claims.

I claim:

1. An article combiner comprising a multi-row receiving conveyor and a motor for driving it, a single-row delivery conveyor and an intermediate conveyor to which articles are diverted from the receiving conveyor and which delivers articles to the single-row conveyor, a second motor for driving the intermediate and delivery conveyors, variable speed motion-transmitting means between each of said motors and the conveyor which it drives, means defining a chamber whose floor is, in part, formed by the intermediate conveyor and in part by the delivery conveyor, said chamber-defining means comprising article-guiding elements which converge in the direction of motion of the conveyors, one of said article-guiding elements being a resilient guide rail fixed at its forward end and whose rear end portion may move outwardly from the normal article path in response to abnormal accumulation of articles within said chamber, and another of said elements being, in part, a rigid guide rail and in part a resilient spring finger whose free end is normally disposed closely adjacent to the forward end portion of the resilient guide rail, but which freely moves away from the latter in response to the pressure of articles against it.

2. Apparatus, according to claim 1, where, within said chamber, there is arranged a detector element which is movable in response to an abnormal accumulation of articles in said chamber, and a switch actuable in response to the movement of said detector to break the circuit of the motor which drives the receiving conveyor.

3. In apparatus which comprises two articles combiners, each including a multi-row receiving conveyor and a delivery conveyor, a multi-row combining conveyor arranged to receive articles directly from each of the respective delivery conveyors, and a single-row conveyor arranged to receive articles from the combining conveyor, a motor for driving the combining conveyor and said last-named single-row conveyor, means defining a chamber into which articles are discharged by the two delivery conveyors and whose floor is defined, in part, by the combining conveyor and in part by said single-row conveyor, said chamber-defining means comprising article-guiding elements which converge in the direction of motion of the conveyors, one of said article-guiding elements being a resilient guide rail fixed at its forward end and whose rear end portion may move outwardly from the normal article path in response to abnormal accumulation of articles within said chamber, and the other of said elements being, in part, a rigid guide rail and in part a flexible leaf spring whose free forward end is normally disposed closely adjacent to the forward end portion of the resilient guide rail, but which may move away from the latter in response to the pressure of articles, a detector within said chamber which is movable in response to an abnormal accumulation of articles therein, and a switch device which, in response to such motion of the detector, breaks the circuits of the motors which drive the delivery conveyors of the two combiners.

4. Article-combining apparatus comprising a receiving conveyor, an intermediate conveyor and a single-row delivery conveyor, said conveyors being parallel and closely adjacent, means for driving the intermediate conveyor at a linear velocity exceeding that of the receiving conveyor, means defining a chamber whose floor is, in part, formed by the intermediate conveyor and in part by the delivery conveyor, the chamber-defining means comprising resilient wall members which extend diagonally of the intermediate conveyor in forwardly converging relation, one of said wall members being fixed at its forward end, as referred to the direction of advance of articles, and with its free end adjacent to the left-hand edge of the intermediate conveyor, means limiting outward motion of said free end, the other of said wall members being fixed at its rear end adjacent to the right-hand edge of the delivery conveyor and with its free end normally contacting the fixed forward end portion of the first named of said wall members, said free end of the second wall member being movable in response to the pressure of articles thereagainst to permit one article at a time to pass from the intermediate conveyor to the delivery conveyor.

5. Apparatus, according to claim 4, including a switch for controlling the supply of current to the conveyor-driving motor means, and a detector within said chamber, which responds to the abnormal accumulation of articles therein, to open said switch and thereby stop the drive of the conveyors.

6. Apparatus for use in disposing discrete articles to form a single row, comprising in combination a receiving conveyor operative to advance articles along a predetermined path, said conveyor being of a width such that a plurality of articles may advance side-by-side, a second conveyor whose receiving end overlaps and is closely adjacent to the delivery end portion of the first conveyor and which is of a width approximating that of the receiving conveyor, means for driving the conveyors at such relative velocities that the linear speed of articles moved by the second conveyor is from 1.3 to 1.5 times that of articles advanced by the first conveyor, means operative to divert articles from the first conveyor to the second conveyor, resilient means operative to apply gentle pressure to articles as they move from the first to the second conveyor to assist them in arranging themselves in a single row on the second conveyor, the second conveyor being of a width such that a plurality of articles may advance side-by-side thereon, rigid parallel guide rails, one at the left and the other at the right-hand side of the first conveyor, rigid guide rails, one at the left and the other at the right-hand side of the second conveyor, a fixed rigid guide rail connecting the end of the left-hand guide rail of the first conveyor with the left-hand guide rail of the second conveyor and extending diagonally across the first conveyor, a second diagonal guide rail parallel to the first diagonal guide rail and which extends across the second conveyor, the means for urging the articles transversely of the second conveyor comprising a leaf spring mounted at one end on that diagonal guide rail which is connected to the left-hand guide rail of the first conveyor, the free end of said leaf spring being normally spaced from the left-hand guide rail of the second conveyor a distance less than the diameter of one of the articles.

7. Apparatus, according to claim 6, wherein the leaf spring, which assists the articles in aligning themselves to form a single row, is adjustably mounted on the diagonal side rail so that it may be moved longitudinally of the latter, thereby to vary the normal distance between its free end and the fixed side rail of the second conveyor.

8. Apparatus of the class described comprising a pair of article combiners, each including a receiving conveyor of a width to permit a plurality of articles to advance abreast, a delivery conveyor of a width such that articles can only advance thereon in tandem relation, and means intervening between the receiving and delivery conveyor of each combiner for diverting articles from the receiving conveyor and for disposing said articles in a single row at the entrance end of the corresponding delivery conveyor, a combining conveyor of a width to permit a plurality of articles to advance abreast, said combining conveyor being interposed between the delivery conveyors of the two combiners and in overlapping relation to said delivery conveyors, means for driving said combining conveyor at a speed such as to advance the articles carried thereby at a linear velocity exceeding that of articles carried by the delivery conveyors, means for diverting articles from each of the delivery conveyors onto the combining conveyor, means for arranging the articles which are so diverted as to form a single row on the combining conveyor, each delivery conveyor having parallel right and left rigid guide rails, the adjacent guide rails of the two delivery conveyors merging above the rear end of the combining conveyor, and the remote guide rails of the delivery conveyors merging, respectively, with diagonally extending guide rails which cross the respective delivery conveyors in converging relation and which merge with right and left side rails at the opposite edges respectively of the combining conveyor, and at least one leaf spring supported by one of the diagonal rails and which extends diagonally over the combining conveyor and forwardly in the direction of movement of the articles and whose free end is movable in response to the pressure of advancing articles, said spring being operative to assist the articles, discharged by the delivery conveyors, to arrange themselves in a single row on the combining conveyor.

9. Apparatus of the class described comprising a pair of article combiners, each including a receiving conveyor of a width to permit a plurality of articles to advance abreast, a delivery conveyor of a width such that articles can only advance thereon in tandem relation, and means intervening between the receiving and delivery conveyor of each combiner for diverting articles from the receiving conveyor and for disposing said articles in a single row at the entrance end of the corresponding delivery conveyor, a combining conveyor of a width to permit a plurality of articles to advance abreast, said combining conveyor being interposed between the delivery conveyors of the two combiners and in overlapping relation to said delivery conveyors, means for driving said combining conveyor at a speed such as to advance the articles carried thereby at a linear velocity exceeding that of articles carried by the delivery conveyors, means for diverting articles from each of the delivery conveyors onto the combining conveyor, means for arranging the articles which are so diverted as to form a single row on the combining conveyor, and wherein a single row conveyor is arranged parallel to the combining conveyor and closely adjacent to the latter and in overlapping relation to the terminal portion of the combining conveyor, means for driving the single-row conveyor at a speed such that articles are advanced thereby at a linear velocity exceeding that of articles advanced by the combining conveyor, means defining a chamber whose floor is formed partly by the combining conveyor and partly by the single-row conveyor and within which articles accumulate, if not removed at the normal rate by the single-row conveyor, a switch which controls the motor circuits of the conveyors of the two combiners, and a detector within said chamber which responds to the presence of an abnormal number of articles therein to actuate the switch and thereby stop the conveyors of the two combiners.

10. Apparatus of the class described comprising a pair of article combiners, each including a receiving conveyor of a width to permit a plurality of articles to advance abreast, a delivery conveyor of a width such that articles can only advance thereon in tandem relation, and means intervening between the receiving and delivery conveyor of each combiner for diverting articles from the receiving conveyor and for disposing said articles in a single row at the entrance end of the corresponding delivery conveyor, a combining conveyor of a width to permit a plurality of articles to advance abreast, said combining conveyor being interposed between the delivery conveyors of the two combiners and in overlapping relation to said delivery conveyors, means for driving said combining conveyor at a speed such as to advance the articles carried thereby at a linear velocity exceeding that of articles carried by the delivery conveyors, means for diverting articles from each of the delivery conveyors onto the combining conveyor, means for arranging the articles which are so diverted as to form a single row on the combining conveyor, and wherein a leaf spring, supported by a guide rail of the single-row conveyor, extends diagonally across the latter conveyor and partially across the combining conveyor, a resilient guide rail having one end fixed to the left-hand guide rail of said single-row conveyor and which extends diagonally across the combining conveyor with its free end normally disposed adjacent to the forward end of the left-hand guide rail of the combining conveyor, said spring and resilient guide rail converging forwardly to form funnel-like entrance whose apex is directed forwardly in the direction of article motion, the free end of the spring moving away from the resilient guide rail in response to the pressure of articles, thereby to allow the articles to pass one at a time so as to form a single row for delivery to the single-row conveyor.

11. Apparatus, according to claim 9, wherein the delivery end portion of said single-row conveyor is arranged in overlapping relation to a delivery conveyor, means for driving said delivery conveyor at a speed such that articles are advanced thereby at a linear velocity exceeding those advanced by the aforesaid single-row conveyor, and fixed guide rails operative to divert articles from the single-row conveyor to said delivery conveyor.

12. Apparatus, according to claim 11, wherein the discharge end of the delivery conveyor is arranged to discharge articles onto the feeding conveyor of a processing unit, and a switch associated with said feeding conveyor, which, in response to the accumulation of an abnormal number of articles on the feeding conveyor, breaks the motor circuits of both combiners.

References Cited in the file of this patent

UNITED STATES PATENTS

| Number | Name | Date |
|---|---|---|
| 1,339,486 | Stuart | May 11, 1920 |
| 1,959,238 | Horsfield | May 15, 1934 |
| 2,060,755 | Exner | Nov. 10, 1936 |
| 2,315,880 | Stiles | Apr. 6, 1943 |
| 2,589,220 | Buckeridge | Mar. 18, 1952 |
| 2,615,555 | Carter | Oct. 28, 1952 |
| 2,804,961 | Carter | Sept. 3, 1957 |